United States Patent
Yasuda et al.

(10) Patent No.: US 10,080,127 B2
(45) Date of Patent: Sep. 18, 2018

(54) NETWORK COMMUNICATION METHOD

(71) Applicant: NEC Corporation, Tokyo (JP)

(72) Inventors: Masato Yasuda, Tokyo (JP); Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 14/904,036

(22) PCT Filed: Jun. 20, 2014

(86) PCT No.: PCT/JP2014/003320
§ 371 (c)(1),
(2) Date: Jan. 8, 2016

(87) PCT Pub. No.: WO2015/004860
PCT Pub. Date: Jan. 15, 2015

(65) Prior Publication Data
US 2016/0165427 A1    Jun. 9, 2016

(30) Foreign Application Priority Data
Jul. 9, 2013  (JP) ................ 2013-143766

(51) Int. Cl.
*H04W 8/00* (2009.01)
*H04W 4/80* (2018.01)
(Continued)

(52) U.S. Cl.
CPC ............ *H04W 8/005* (2013.01); *H04W 4/80* (2018.02); *H04W 84/20* (2013.01); *H04W 88/04* (2013.01)

(58) Field of Classification Search
None
See application file for complete search history.

(56) References Cited

U.S. PATENT DOCUMENTS

2005/0014467 A1* 1/2005 Ishiwata ............... H04W 84/20
  455/39
2005/0058112 A1* 3/2005 Lahey ................ H04L 41/5067
  370/338

(Continued)

FOREIGN PATENT DOCUMENTS

JP  2005-27280   1/2005
JP  2010-268300  11/2010
(Continued)

OTHER PUBLICATIONS

Wi-Fi Alliance Technical Committee P2P Task Group, "Wi-Fi Peer-to-Peer (P2P) Technical Specification", Version 1.1, 2010.
(Continued)

*Primary Examiner* — Brian Roberts
(74) *Attorney, Agent, or Firm* — Finnegan, Henderson, Farabow, Garrett & Dunner, L.L.P.

(57) ABSTRACT

A first communication terminal, unconnected with a communication network, searches for a second communication terminal existing around the own communication terminal. In the communication network, one of communication terminals functions as a master having a function of an access point and the rest of the communication terminals function as slaves of the master. Among the one or more second communication terminals found through the search, the first communication terminal determines a second communication terminal, in which information included in a communication message received from the second communication terminal shows that it is a connected master terminal which is a terminal connected with the communication network and functions as the master, to be a connection counterpart. Then, the first communication terminal configures a network with the determined connection counterpart.

4 Claims, 13 Drawing Sheets

(51) Int. Cl.
  *H04W 84/20* (2009.01)
  *H04W 88/04* (2009.01)

(56) References Cited

U.S. PATENT DOCUMENTS

2012/0063327 A1* 3/2012 Sakai .................... H04W 28/18
                                                            370/242
2012/0296986 A1* 11/2012 Hassan ................. H04W 12/06
                                                            709/206

FOREIGN PATENT DOCUMENTS

JP       2013-507029       2/2013
WO    WO 2005/034434 A1    4/2005

OTHER PUBLICATIONS

International Search Report dated Sep. 16, 2014 in corresponding PCT International Application.

* cited by examiner

NETWORK COMMUNICATION METHOD

CROSS-REFERENCE TO RELATED PATENT APPLICATIONS

This application is a National Stage Entry of International Application No. PCT/JP2014/003320, filed Jun. 20, 2014, which claims priority from Japanese Patent Application No. 2013-143766, filed Jul. 9, 2013. The entire contents of the above-referenced applications are expressly incorporated herein by reference.

TECHNICAL FIELD

The present invention relates to a communication terminal, a network configuration method, and a program.

BACKGROUND ART

As a type of short-distance communication network, a communication network conforming to the Wi-Fi Direct specification has been known (see Non-Patent Document 1, for example). In the communication network conforming to the Wi-Fi Direct specification, one of a plurality of communication terminals participating in a network functions as a master having an access point function, and the rest of the communication terminals function as slaves of the master. Compared with a Wi-Fi Ad-hoc network in which only one-to-one connection is available, a communication network conforming to the Wi-Fi Direct specification has features that one-to-many connection is available, communication between slaves can be established via the master, security strength is relatively high, and the like. As such, a communication network conforming to the Wi-Fi Direct specification has been used in various applications such as data sharing, recently. The present invention relates to a method of configuring such a communication network conforming to the Wi-Fi Direct specification. However, application of the present invention is not limited to a communication network conforming to the Wi-Fi Direct specification.

Patent Document 1 describes an exemplary method of configuring a communication network conforming to the Wi-Fi Direct specification. In Patent Document 1, in order to exchange P2P (Peer to Peer) capability information, each communication terminal is able to exchange information with another communication terminal to request establishment of a P2P connection, without user intervention. When exchanging the P2P capability information, parameter information showing a connection type (Wi-Fi Direct, or the like), a protocol, corresponding authentication, a security method, or the like is exchanged. Then, based on the found P2P type or the like, each communication terminal determines whether or not to establish a P2P connection with another communication terminal. For example, a communication terminal requests a connection with another communication terminal via the network connection type of Wi-Fi Direct, in order to use a VoIP service. In the process, the case of establishing a P2P connection between only two communication terminals and the case of establishing a P2P connection among two or more communication terminals are exemplary shown.

Patent Document 1: JP 2013-507029 A

Non-Patent Document 1: Wi-Fi Alliance Technical Committee P2P Task Group Wi-Fi Peer-to-Peer (P2P) Technical Specification Version 1.1

SUMMARY

In a communication network conforming to the Wi-Fi Direct specification, communication can be made between communication terminals connected with the communication network. Meanwhile, between a communication terminal connected with a communication network and a communication terminal connected with another communication terminal, they cannot communicate with each other even though they exist at physically close locations. As such, in the case where a communication terminal unconnected with any communication network intends to communicate with a larger number of communication terminals, it is necessary to connect with a communication terminal serving as a master of the communication terminals which have formed a communication network, existing around the own communication terminal. However, in the network configuration method described in Patent Document 1, if both a communication terminal serving as a master of the communication terminals having formed a communication network and another communication terminal unconnected with any communication network exist around, there is a case where a communication terminal connects to a communication terminal unconnected with any communication network. As a result, such a communication terminal loses an opportunity to communicate with a larger number of communication terminals.

An object of the present invention is to provide a network configuration method capable of solving the above-described problem, that is, a problem that a communication device intending to form a network having a larger number of communication terminals fails to form such a network.

A network configuration method according to a first exemplary aspect of the present invention is a method of configuring a communication network in which one of a plurality of communication terminals functions as a master having a function of an access point and the rest of the communication terminals function as slaves of the master. The method includes by a first communication terminal unconnected with the communication network, searching for a second communication terminal existing around an own communication terminal; and by the first communication terminal, determining, among the one or more second communication terminals found through the search, a second communication terminal in which information included in a communication message received from the second communication terminal shows that the second communication terminal is a connected master terminal, to be a connection counterpart, the connected master terminal being a terminal connected with the communication network and functions as the master, and configuring the network with the determined connection counterpart.

A communication terminal according to a second exemplary aspect of the present invention is a communication terminal that configures a communication network in which one of a plurality of communication terminals functions as a master having a function of an access point and the rest of the communication terminals function as slaves of the master. The communication terminal includes a wireless communication unit that transmits and receives a communication message with another communication terminal; and a control unit connected with the wireless communication unit.

The control unit searches for another communication terminal existing around an own communication terminal; and among the one or more other communication terminals found through the search, the control unit determines another communication terminal in which information included in a communication message received from the other communication terminal shows that the other communication terminal is a connected master terminal, to be a connection counterpart, the connected master terminal being a terminal connected with the communication network and functioning as the master, and configures the network with the determined connection counterpart.

A network configuration method according to a third exemplary aspect of the present invention is a network configuration method performed by a communication terminal that configures a communication network in which one of a plurality of communication terminals functions as a master having a function of an access point and the rest of the communication terminals function as slaves of the master. The method includes searching for another communication terminal existing around an own communication terminal; and among the one or more other communication terminals found through the search, determining another communication terminal in which information included in a communication message received from the other communication terminal shows that the other communication terminal is a connected master terminal, to be a connection counterpart, the connected master terminal being a terminal connected with the communication network and functioning as the master, and configuring the network with the determined connection counterpart.

A program, according to a fourth exemplary aspect of the present invention, causes a computer held by a communication terminal to function as, the communication terminal configuring a communication network in which one of a plurality of communication terminals functions as a master having a function of an access point and the rest of the communication terminals function as slaves of the master:

a wireless communication unit that transmits and receives a communication message with another communication terminal; and a control unit connected with the wireless communication unit.

The control unit searches for another communication terminal existing around an own communication terminal; and among the one or more other communication terminals found through the search, the control unit determines another communication terminal in which information included in a communication message received from the other communication terminal shows that the other communication terminal is a connected master terminal, to be a connection counterpart, the connected master terminal being a terminal connected with the communication network and functioning as the master, and configures the network with the determined connection counterpart.

As the present invention has the above-described configurations, it is possible to prevent a communication device intending to form a network having a larger number of communication terminals from failing to form such a network.

EXEMPLARY EMBODIMENTS

Next, exemplary embodiments of the present invention will be described with reference to the drawings.

[First Exemplary Embodiment]

Figure 1:
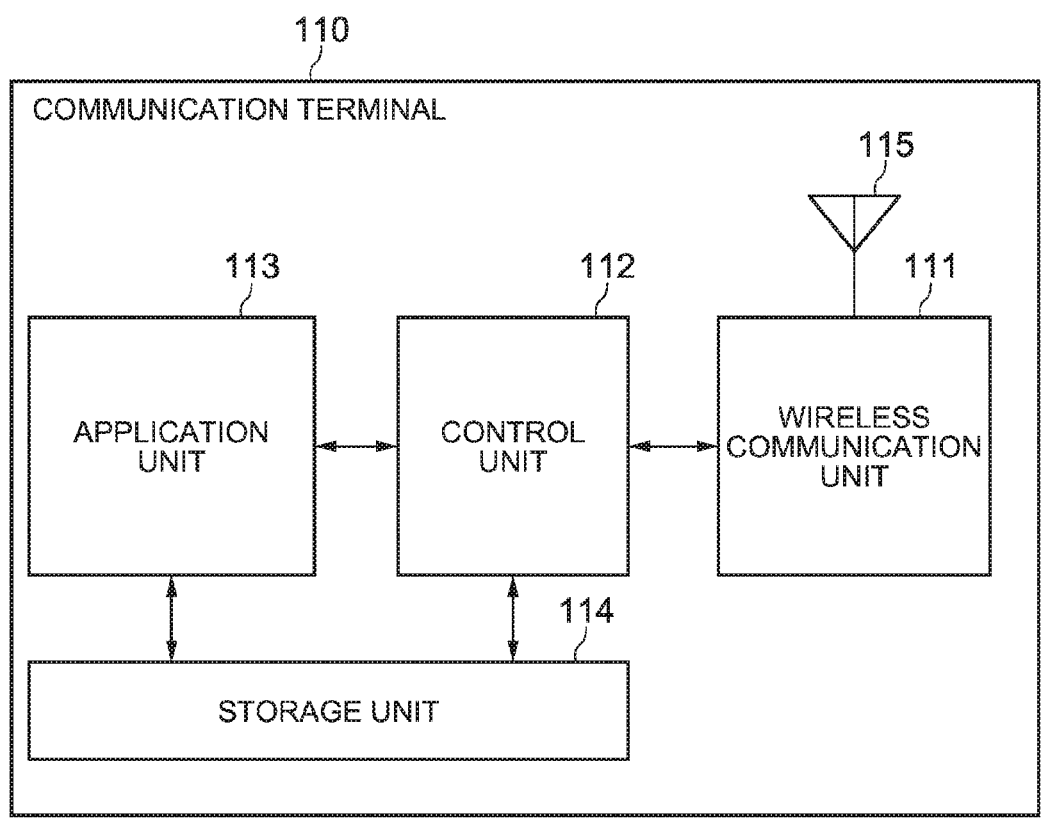
FIG. 1 is a block diagram of a communication terminal according to a first exemplary embodiment of the present invention.

Referring to FIG. 1, a communication terminal 110 according to a first exemplary embodiment of the present invention is a wireless communication terminal which forms a communication network conforming to the Wi-Fi Direct specification. The communication terminal 110 includes a wireless communication unit 111, a control unit 112, an application unit 113, a storage unit 114, and an antenna 115.

The wireless communication unit 111 has a function of transmitting and receiving communication messages wirelessly with another communication terminal. At the time of transmission, the wireless communication unit 111 creates a packet of a communication message in response to a request from the control unit 112, performs processing such as addition of a header and an error detection code to the created packet, generates a modulation signal of a frequency band of a carrier wave from the processed data, and transmits it as a radio signal from the antenna 115. Further, at the time of reception, the wireless communication unit 111 demodulates a radio signal received by the antenna 115 to thereby decode the packet of a communication message, and notifies the control unit 112 of the communication message after checking that there is no error based on the error detection code.

The control unit 112 has a function of governing overall control of the communication terminal 110 including determination of a frequency to be used by the wireless communication unit 111, creation and transmission instruction of various types of communication messages, interpretation of received various types of communication messages, and control of connection processing. For example, the control unit 112 has a function of, if the own communication terminal is not connected with a communication network, searches for a communication terminal existing around the own communication terminal by transmitting and receiving communication messages regarding the search through the wireless communication unit 111 with another communication terminal existing around the own communication terminal. Further, the control unit 112 also has a function of determining, from among one or more communication terminals found through the search, a communication terminal in which information included in a communication message received from such a communication terminal shows that it is connected with a communication network and is a terminal functioning as a master (connected master terminal) to be a connection counterpart, and configuring a communication network with the determined connection counterpart.

The application unit 113 has a function of executing an application program. Any types and any number of application programs may be used. For example, in the application unit 113, an application for making voice communication, an application for performing file transfer, an application for exchanging content data, and the like, with another communication terminal connected with the communication network, may be executed.

The storage unit 114 is configured of storage devices such as a ROM (Read Only Memory), a RAM (Random Access Memory), and a hard disk, and stores programs and various types of data. Data to be stored includes control data and application data. Control data includes own communication terminal status information representing whether or not the own communication terminal 110 is connected with a communication network, information of the master when the own communication terminal 110 is connected with a communication network, information received from another communication terminal searched (communication address, terminal name, and status information of the communication terminal, the status information being another communication terminal status information representing unconnected terminal not connected with a communication network, a master terminal having being connected, and the like), and the like. Application data includes content data shared by the application unit 113 and another communication terminal. Programs to be stored include an application program executed by the application unit 113.

Next, operation of the communication terminal 110 according to the present embodiment will be described.

Figure 2:
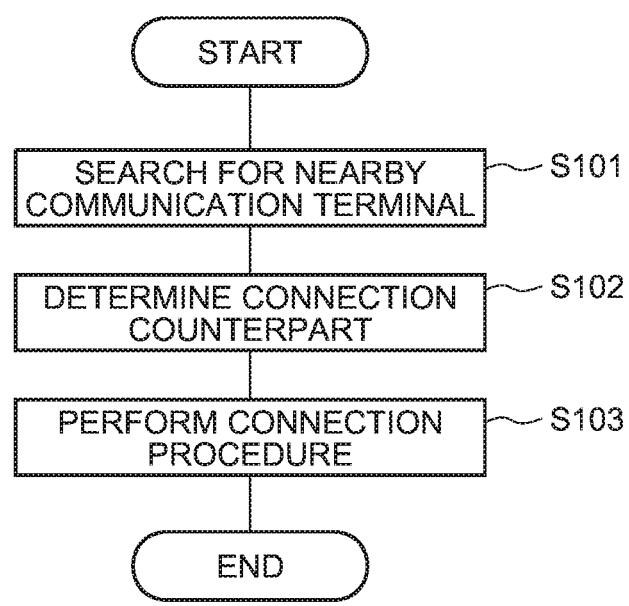
FIG. 2 is a flowchart showing operation of a communication terminal according to the first exemplary embodiment of the present invention.

When the communication terminal 110 is activated, the control unit 112 begins execution of the processing shown in FIG. 2. First, the control unit 112 of the communication terminal 110 searches for a nearby communication terminal by transmitting and receiving communication messages regarding the search via the wireless communication unit 111 with another communication terminal existing around the own communication terminal (step S101). The search for a nearby communication terminal is performed in conformity with a device discovery procedure of the Wi-Fi Direct specification, for example. When the control unit 112 finds one or more communication terminals, the control unit 112 proceeds to the processing of step S102. Meanwhile, if the control unit 112 fails to find any communication terminal, the control unit 112 stays at step S101 and continues processing to search for a nearby communication terminal.

Next, at step S102, the control unit 112 of the communication terminal 110 determines a connection counterpart from the one or more communication terminals found through the search. Specifically, if there is a connected master terminal in the one or more communication terminals found, the control unit 112 determines the communication terminal, which is a connected master terminal, to be a connection counterpart. Then, the control unit 112 proceeds to the processing of step S103. In the other case, that is, if there is no connected master terminal in the one or more communication terminals found, any method may be used to determine a connection counterpart. For example, the control unit 112 may determine a communication terminal, of the one or more found communication terminals which are not connected master terminals, to be a connection counterpart, or give up determination of a connection counterpart and return to the processing of step S101.

Next, at step S103, the control unit 112 of the communication terminal 110 configures a communication network by transmitting and receiving communication messages via the wireless communication unit 111 with the communication terminal determined to be a connection counterpart. Then, the communication terminal 110 begins transmission and reception of application data with the other communication terminal connected with the communication network, by the application unit 113.

Next, operation of the present embodiment will be described in more detail.

Figure 3:
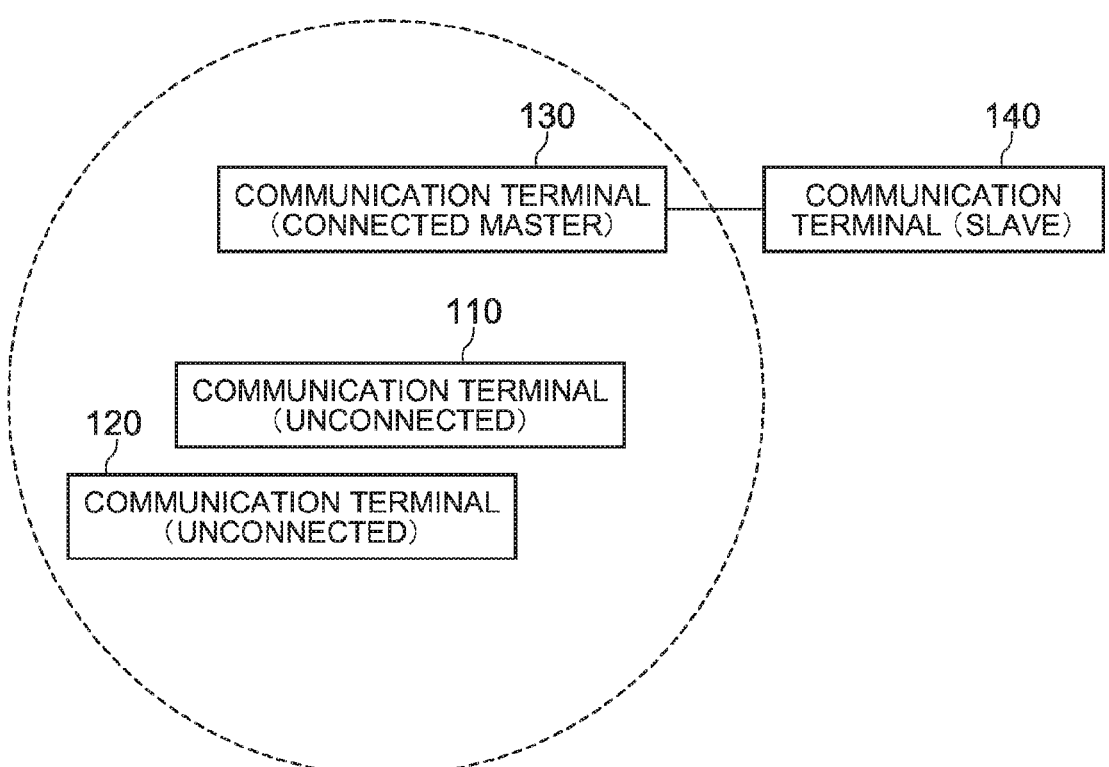
FIG. 3 is an explanatory diagram of a state where an unconnected communication terminal configures a network with another communication terminal in the first exemplary embodiment of the present invention.

As shown in FIG. 3, it is assumed that there are communication terminals 120 and 130 in a communicable area of the communication terminal 110 unconnected with any communication network. Here, the communication terminal 120 is unconnected with a network like the communication terminal 110. Further, the communication terminal 130 configures a network with another communication terminal 140 and functions as a master.

Figure 4:
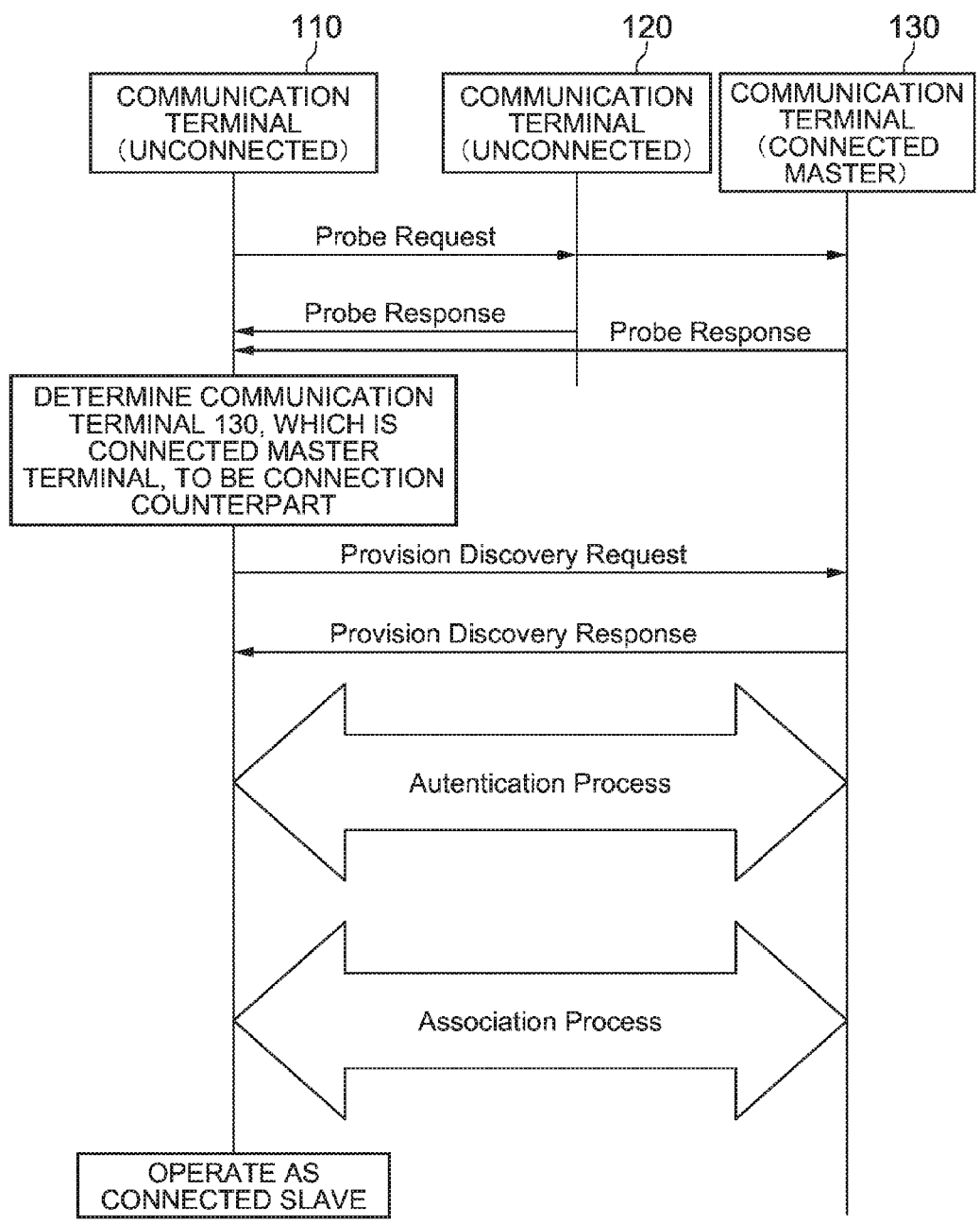
FIG. 4 is a sequence chart showing operation of configuring a network by an unconnected communication terminal with another communication terminal according to the first exemplary embodiment of the present invention.

FIG. 4 is a sequence chart showing operation of the present embodiment. When the communication terminal 110 begins a search operation, as shown in FIG. 4, the communication terminal 110 transmits Probe Request to the surroundings. When the communication terminals 120 and 130 receive and detect the Probe Request, they return Probe Response.

By receiving the Probe Response, the communication terminal 110 recognizes that there are other communication terminals 120 and 130 around the own communication terminal. Further, by analyzing the received Probe Response, the communication terminal 110 recognizes that the communication terminal 120 is an unconnected terminal which is not connected with a network, and the communication terminal 130 is a connected master terminal. According to the Wi-Fi Direct specification, the Probe Response transmitted from the connected master terminal includes an attribute of P2P Group Info, and the Probe Response transmitted from the communication unconnected with the network does not include an attribute of the P2P Group Info. As such, according to the presence or absence of an attribute of Group Info, it is possible to determine whether or not it is a connected master terminal. However, a method of determining whether or not it is a connected master terminal is not limited to a method using presence or absence of an attribute of Group Info, and another method may be used. For example, according to the Wi-Fi Direct specification, as Probe Response transmitted from a connected master terminal includes an attribute of Notice of Absence, it is possible to determine whether or not it is a connected master terminal depending on presence or absence thereof.

In the situation shown in FIG. 4, the communication terminal 110 determines the communication terminal 130 which is a connected master terminal, of the communication terminals 120 and 130 existing around, to be a connection counterpart. Then, as the communication terminal 130 determined to be a connection counterpart is a connected master terminal, the communication terminal 110 connects to the communication terminal 130 according to the procedure conforming to the Wi-Fi Direct specification. This means that the communication terminal 110 joins the communication network, in which the communication terminal 130 is the master, as a client. Specifically, as shown in FIG. 4, the communication terminal 110 transmits Provision Discovery Request to the communication terminal 130, and when the communication terminal 130 receives it, the communication terminal 130 transmits Provision Discovery Response to the communication terminal 110. Then, Authentication Process and Association Process are performed between the communication terminal 110 and the communication terminal 130.

In this way, according to the present embodiment, it is possible to prevent the communication terminal 110 intending to form a network having a larger number of communication terminals from failing to form such a network. This is because if there is a connected master terminal in the one or more communication terminals found, the communication terminal 110 determines the communication terminal which is a connected master terminal to be a connection counterpart.

[Second Exemplary Embodiment]

Figure 5:
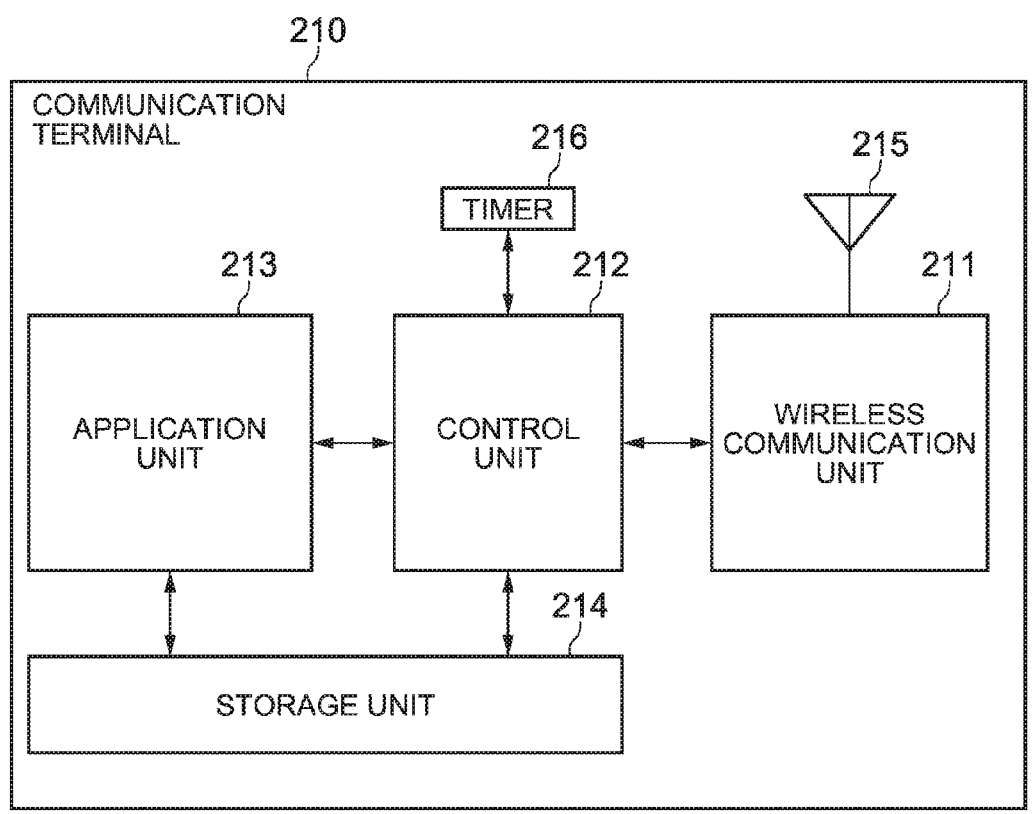
FIG. 5 is a block diagram of a communication terminal according to a second exemplary embodiment of the present invention.

Referring to FIG. 5, a communication terminal 210 according to a second exemplary embodiment of the present invention is a wireless communication terminal which forms a communication network conforming to the Wi-Fi Direct specification. The communication terminal 210 includes a wireless communication unit 211, a control unit 212, an application unit 213, a storage unit 214, an antenna 215, and a timer 216.

The wireless communication unit 211, the application unit 213, the storage unit 214, and the antenna 215 are the same as the wireless communication unit 111, the application unit 113, the storage unit 114, and the antenna 115 of the communication terminal 110 in the first exemplary embodiment of the present invention shown in FIG. 1.

The timer 216 has a function of measuring passage of a certain period of time. When a certain time has passed after activation by an instruction from the control unit 212, the timer 216 outputs a time-out signal to the control unit 212.

The control unit 212 has a function of governing overall control of the communication terminal 210 including determination of a frequency to be used by the wireless communication unit 211, creation and transmission instruction of various types of communication messages, interpretation of received various types of communication messages, and control of connection processing. For example, the control unit 212 has a function of, when the own communication terminal is not connected with a communication network, searching for another communication terminal existing around the own communication terminal by transmitting and receiving communication messages regarding the search thorough the wireless communication unit 211 with another communication terminal existing around the own communication terminal.

In the search of another communication terminal, if another communication terminal found first in the search is a connected master terminal, the control unit 212 ends the search for another communication terminal and proceeds to connection counterpart determination processing. Meanwhile, if another communication terminal found first in the search is not a connected master terminal, the control unit 212 activates the timer 216. Then, the control unit 212 continues the search for another communication terminal under a condition that it terminates the search when time-out occurs in the timer 216 or another communication terminal which is a connected master terminal is found, whichever is earlier, and proceeds to connection counterpart determination processing.

Next, operation of the communication terminal 210 according to the present embodiment will be described.

Figure 6:
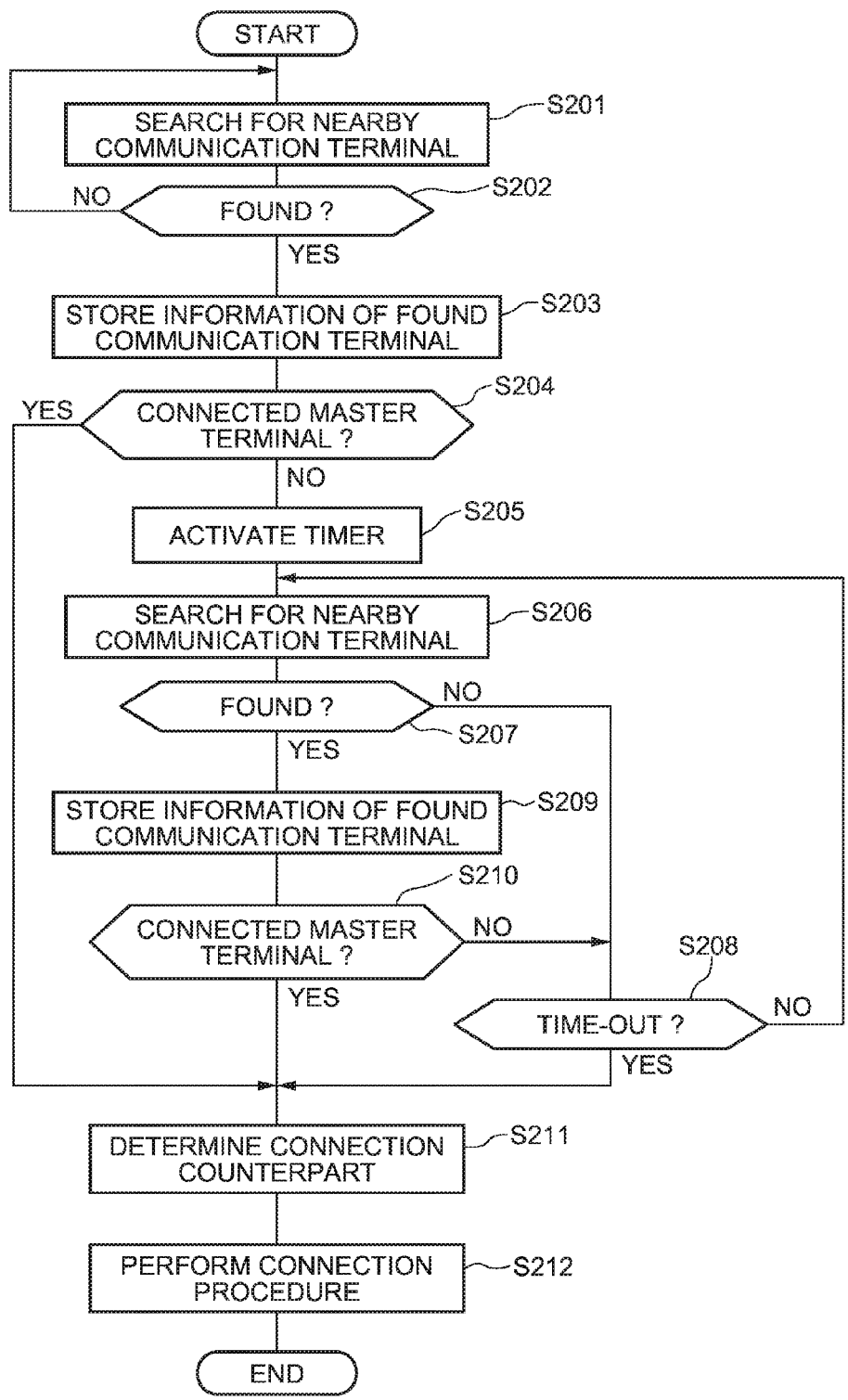
FIG. 6 is a flowchart showing operation of a communication terminal according to the second exemplary embodiment of the present invention.

When the communication terminal 210 is activated, it begins execution of the processing shown in FIG. 6. First, the control unit 212 of the communication terminal 210 searches for a nearby communication terminal by transmitting and receiving communication messages regarding the search via the wireless communication unit 211 with another communication terminal existing around the own communication terminal (step S201). The search for a nearby communication terminal is performed in conformity with Device Discovery Procedure of the Wi-Fi Direct specification, for example. When the control unit 212 finds a communication terminal through the search (YES at step S202), the control unit 212 proceeds to the processing of step S203. Meanwhile, if the control unit 212 fails to find any communication terminal, the control unit 212 continues processing to search for a nearby communication terminal.

Next, at step S203, the control unit 212 of the communication terminal 210 stores information (for example, Prove Response) received from the found communication terminal, in the storage unit 214. Then, the control unit 212 analyzes information received from the found communication terminal, and determines whether or not the communication terminal is a connected master terminal (step S204). If the found communication terminal is a connected master terminal, the control unit 212 proceeds to processing of step S211.

On the other hand, if the found communication terminal is not a connected master terminal, the control unit 212 performs the following processing. First, the control unit 212 activates the timer 216 (step S205). Then, the control unit 212 searches for a nearby communication terminal by the same method as that of step S201 (step S206). Then, the control unit 212 determines whether a new communication terminal is found or time-out occurs (steps S207, S208). If a new communication terminal is found, the control unit 212 stores the information (for example, Probe Response) received from the found communication terminal in the storage unit 214 (step S209), analyzes the received information, and determines whether or not the found communication terminal is a connected master terminal (step S210). Then, if it is a connected master terminal, the control unit 212 proceeds to the processing of step S211, while if it is not a connected master terminal, the control unit 212 proceeds to the processing of step S208. On the other hand, if time-out is detected at step S208, the control unit 212 proceeds to the processing of step S211, while if time-out has not occurred, it returns to the processing of step S206.

At step S211, the control unit 212 of the communication terminal 210 determines a communication counterpart from one or more communication terminals found through the search up to this point. Specifically, if there is a connected master terminal in the one or more communication terminals found, the control unit 212 determines a communication terminal which is a connected master terminal to be a connection counterpart. Then, the control unit 212 proceeds to the processing of step S212. In another case, that is, if there is not a connected master terminal in the one or more communication terminals found, the control unit 212 determines a communication terminal of the one or more communication terminals which are not connected master terminals, that is, an unconnected communication terminal, to be a connection counterpart. Then, the control unit 212 proceeds to the processing of step S212.

Next, at step S212, the control unit 212 transmits and receives communication messages with the other communication terminal determined to be a connection counterpart, via the wireless communication unit 211, and configures a communication network. Then, the communication terminal 210 begins transmission and reception of application data with the other communication terminal connected with the communication network, by the application unit 213.

Next, operation of the present embodiment will be described more specifically.

Figure 7:
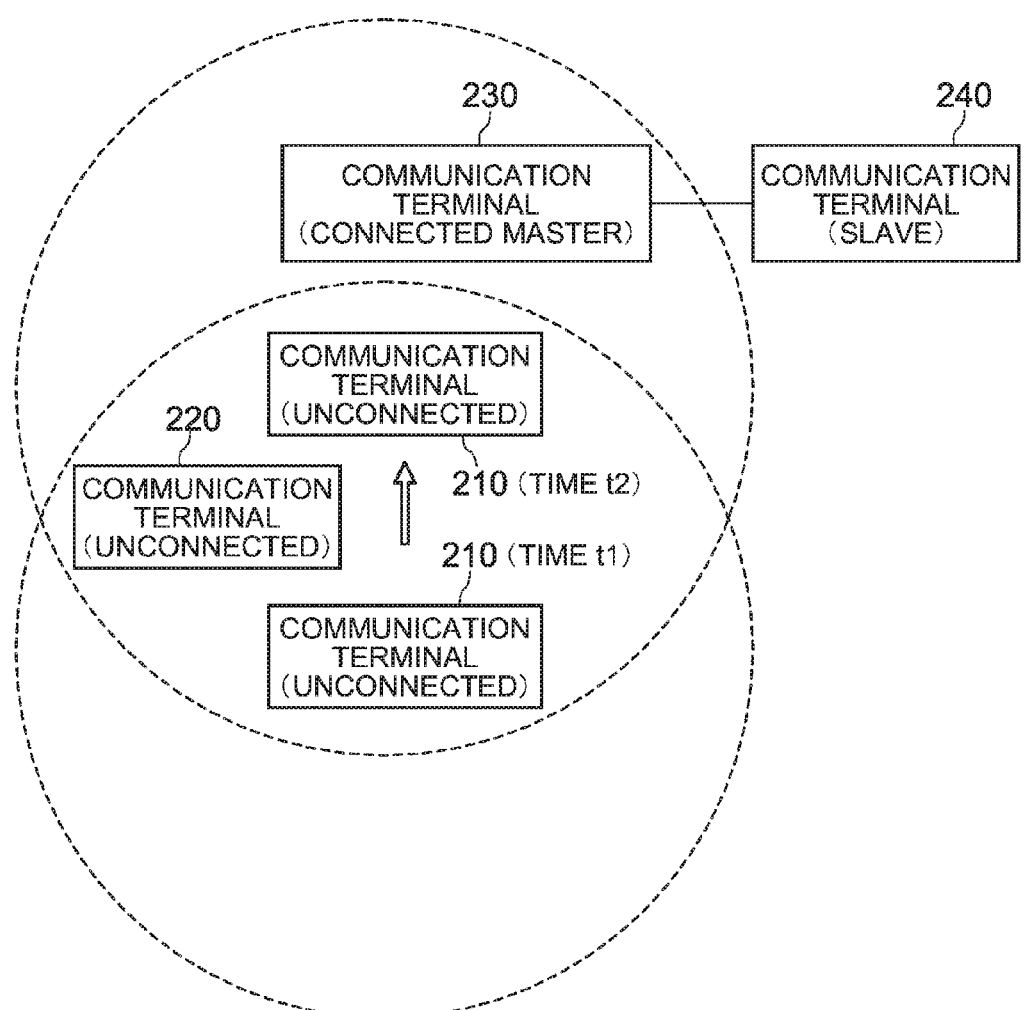
FIG. 7 is an explanatory diagram of a state where an unconnected communication terminal configures a network with another communication terminal in the second exemplary embodiment of the present invention.

As shown in FIG. 7, it is assumed that there are communication terminals 220 and 230 around the communication terminal 210 unconnected with any communication network. Here, the communication terminal 220 is unconnected with a network, like the communication terminal 210. Further, it is assumed that the communication terminal 230 has configured a network with another communication terminal 240 and functions as a master. However, at a point of time t1, the communication terminal 220 is included in the communicable area of the communication terminal 210 but the communication terminal 230 is not included therein. Further, the communication terminal 210 moves in an arrow direction, and at a point of time t2, it is assumed that the communication terminal 220 and the communication terminal 230 are included in the communicable area of the communication terminal 210.

Figure 8:
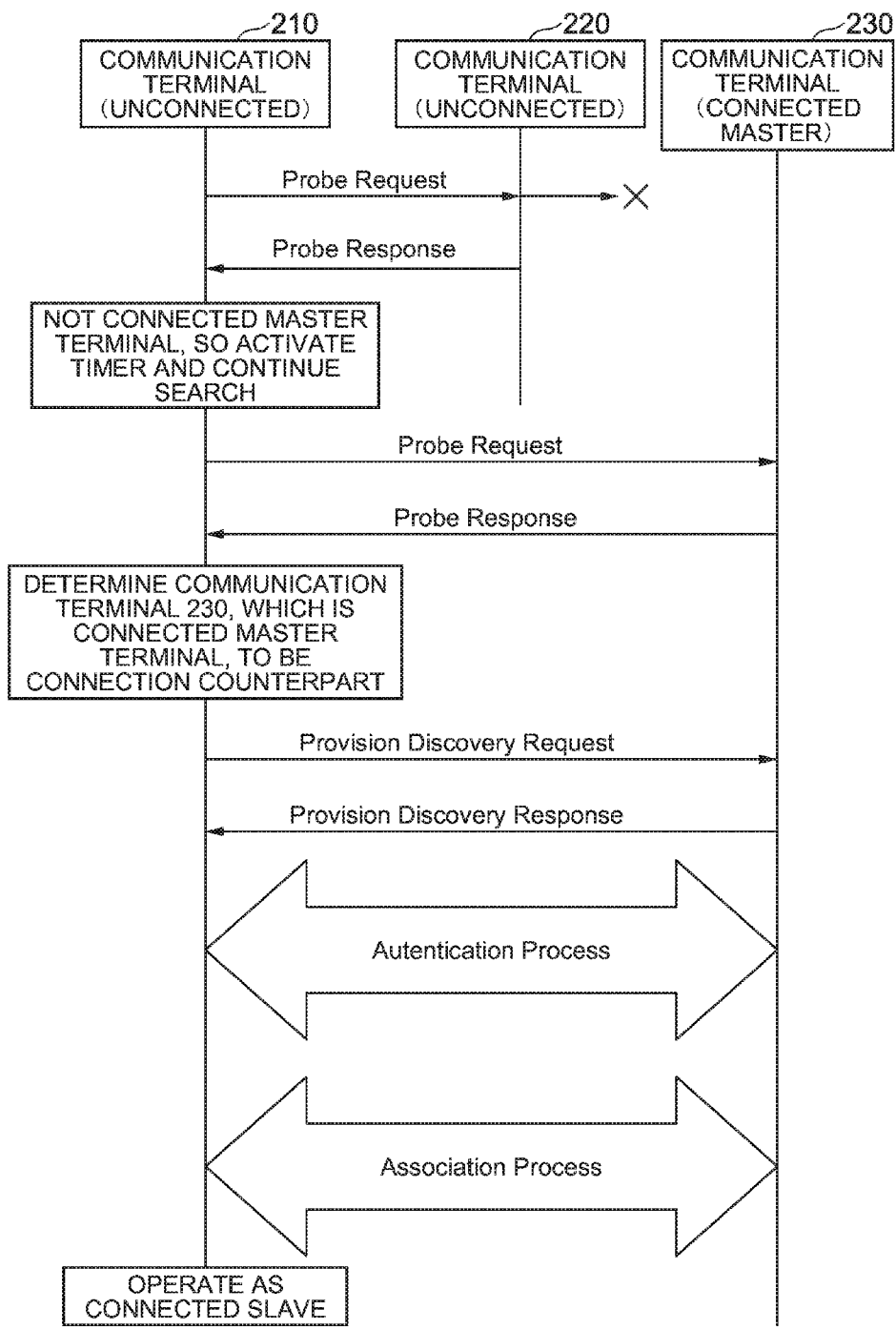
FIG. 8 is a sequence chart showing operation of configuring a network by an unconnected communication terminal with another communication terminal in the second exemplary embodiment of the present invention.

FIG. 8 is a sequence chart showing operation of the present embodiment. When the communication terminal 210 begins a searching operation from the time t1, it transmits Probe Request to the surroundings as shown in FIG. 8. The Probe Request is received by the communication terminal 220 existing in the communicable area of the communication terminal 210, and is not received by the communication terminal 230 in the outside of the communicable area of the communication terminal 210. When the communication terminal 220 receives the Probe Request and detects it, it returns Probe Response.

Upon receipt of the Probe Response, the communication terminal 210 recognizes that the communication terminal 220 exists around the own communication terminal. Further, by analyzing the received Probe Response, the communication terminal 210 recognizes that the communication terminal 220 is not a connected master terminal. As such, the communication terminal 210 activates the timer 216, and continues the searching operation on condition that the operation is terminated when time-out occurs in the timer 216 or a connected master terminal is found, whichever is earlier. In the example shown in FIG. 8, Probe Request transmitted from the communication terminal 210 is received by the communication terminal 230 at a subsequent point of time, and Probe Response is transmitted from the communication terminal 230 to the communication terminal 210.

By receiving the Probe Response, the communication terminal 210 recognizes that there is the communication terminal 230 around the own communication terminal. Further, by analyzing the received Probe Response, the communication terminal 210 recognizes that the communication terminal 230 is a connected master terminal. Consequently, the communication terminal 210 terminates the search for a communication terminal. Then, from the communication terminals 220 and 230 existing around, the communication terminal 210 determines the communication terminal 230, which is a connected master terminal, to be a connection counterpart. Then, as the communication terminal 230 determined to be a connection counterpart is a connected master terminal, the communication terminal 210 connects to the communication terminal 230 according to the procedure conforming to the Wi-Fi Direct specification.

In this way, according to the present embodiment, it is possible to prevent the communication terminal 210 intending to form a network having a larger number of communication terminals from failing to form such a network. This is because if a communication terminal found first through the search is not a connected master terminal, the communication terminal 210 continues the search for finding another communication terminal which is a connected master terminal. Further, if there is a connected master terminal in the one or more communication terminals found, the communication terminal 210 determines the communication terminal which is a connected master terminal to be a connection counterpart.

Further, according to the present embodiment, it is possible to prevent the communication terminal 210 intending to form a network having a larger number of communication terminals from continuing a search wastefully. This is because if a communication terminal found first through the search is a connected master terminal, the communication terminal 210 terminates the search for another communication terminal, while if a communication terminal found first through the search is not a connected master terminal, the communication terminal 210 terminates the search for another communication terminal on condition that the search is terminated when a certain period of time passed or another communication terminal which is a connected master terminal is found, whichever is earlier.

[Third Exemplary Embodiment]

Figure 9:
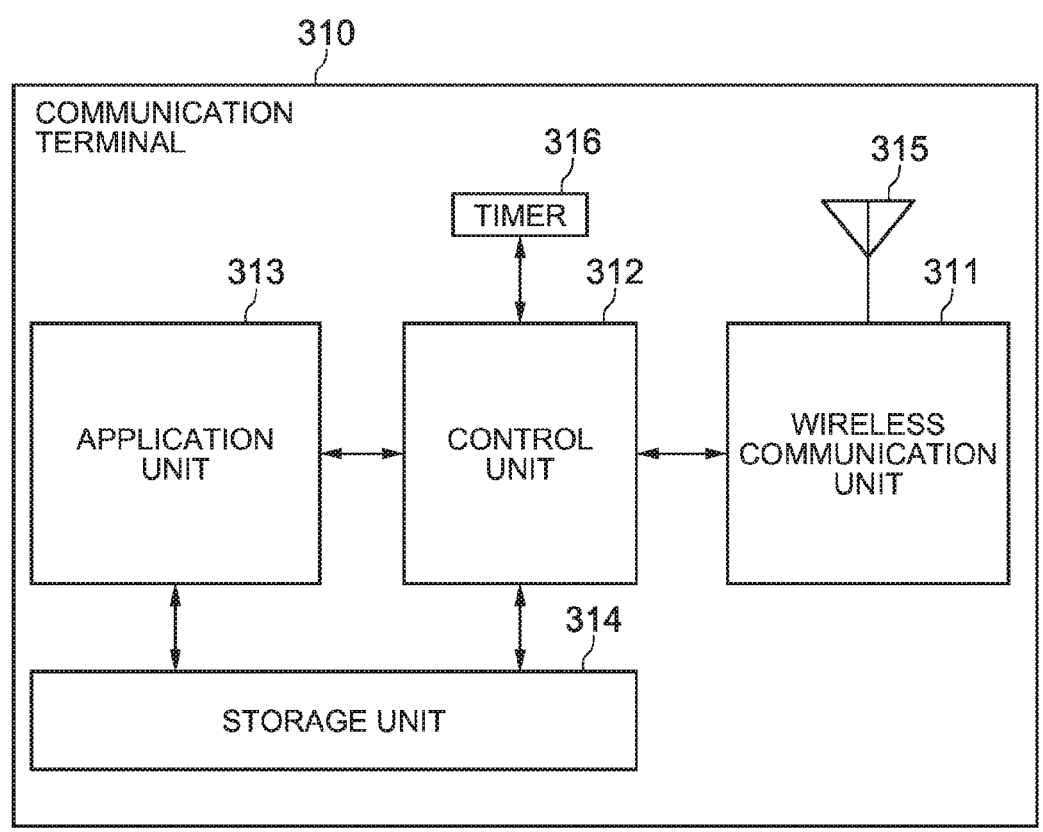
FIG. 9 is a block diagram of a communication terminal according to a third exemplary embodiment of the present invention.

Referring to FIG. 9, a communication terminal 310 according to a third exemplary embodiment of the present invention is a wireless communication terminal which forms a communication network conforming to the Wi-Fi Direct specification. The communication terminal 310 includes a wireless communication unit 311, a control unit 312, an application unit 313, a storage unit 314, an antenna 315, and a timer 316.

The wireless communication unit 311, the application unit 313, the storage unit 314, the antenna 315, and the timer 316 are the same as the wireless communication unit 211, the application unit 213, the storage unit 214, the antenna 215, and the timer 216 of the communication terminal 210 in the second exemplary embodiment of the present invention shown in FIG. 5

The control unit 312 has a function of governing overall control of the communication terminal 310 including determination of a frequency to be used by the wireless communication unit 311, creation and transmission instruction of various types of communication messages, interpretation of received various types of communication messages, and control of connection processing. For example, the control unit 312 has a function of, when the own communication terminal is not connected with a communication network, searching for another communication terminal existing around the own communication terminal by transmitting and receiving communication messages regarding the search thorough the wireless communication unit 311 with another communication terminal existing around the own communication terminal. The control unit 312 continues the search for another communication terminal until a certain period of time has passed from the time when the first communication terminal was found. Then, the control unit 312 determines a connection counterpart from the one or more communication terminals found through the search, and configures a connection network with the determined connection counterpart.

When determining the connection counterpart, if there is a connected master terminal in the one or more communication terminals found through the search, the control unit 312 determines the connected master terminal to be a connection counterpart. If there are a plurality of connected master terminals, the control unit 312 determines a connected master terminal having the largest number of clients to be a connection counterpart. Further, if there is no connected master terminal in the one or more communication terminals found, the control unit 312 determines a communication terminal which is not a connected master terminal, that is, a communication terminal unconnected with a communication network, to be a connection counterpart.

When determining the connection counterpart, in the case where a plurality of connected master terminals are found through the search, the control unit 312, determines a connected master terminal having a larger number of slaves to be a connection destination. According to the Wi-Fi Direct specification, Probe Response from a connected master terminal includes the device address of the master and the device addresses of the clients. As such, by comparing the number of device addresses of the clients included in Probe Response, it is possible to determine a terminal having a larger number of clients among the connected terminals.

Next, operation of the communication terminal 310 according to the present embodiment will be described.

Figure 10:
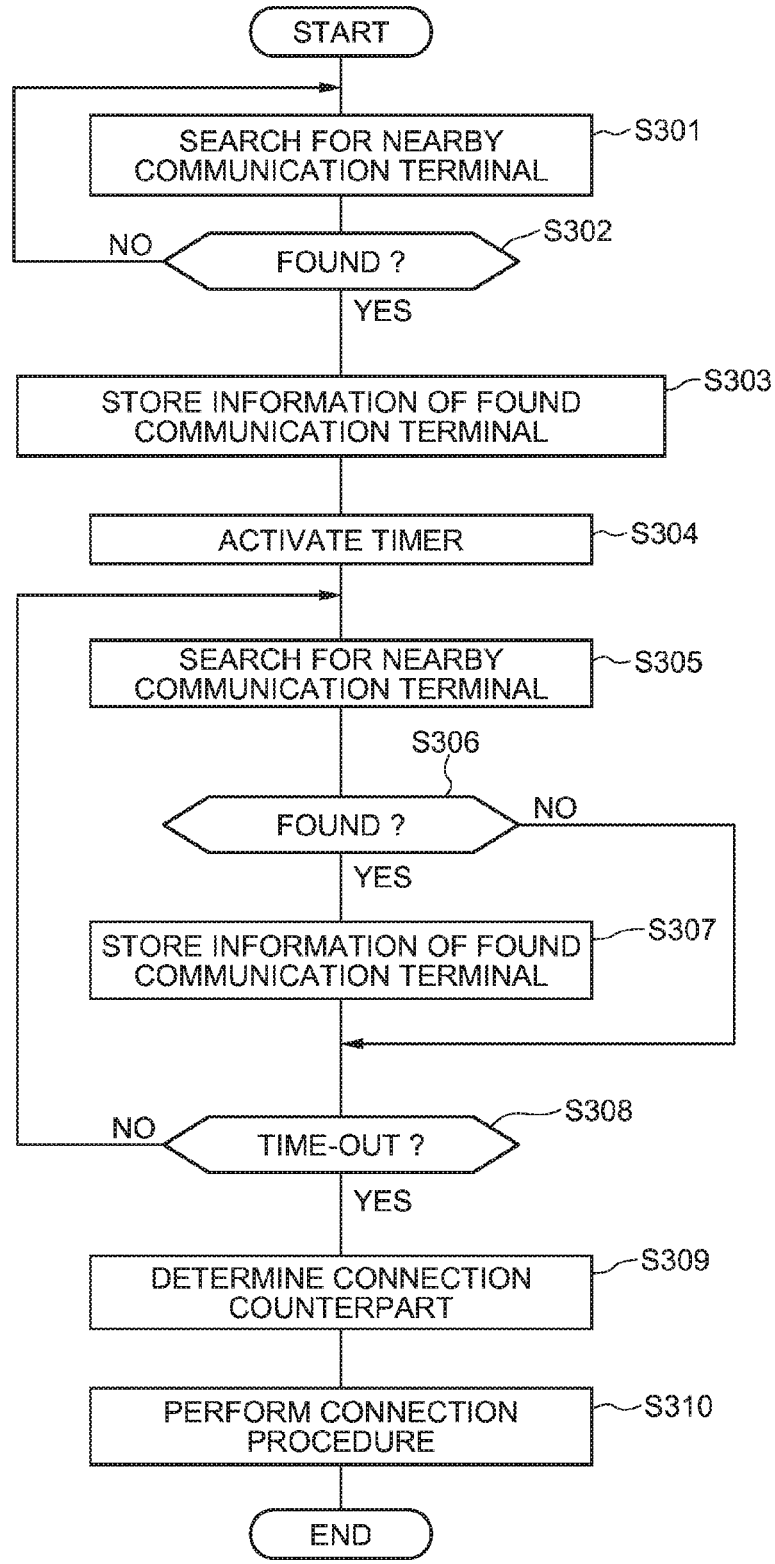
FIG. 10 is a flowchart showing operation of a communication terminal according to the third exemplary embodiment of the present invention.

When the communication terminal 310 is activated, it begins execution of the processing shown in FIG. 10. First, the control unit 312 of the communication terminal 310 searches for a nearby communication terminal by transmitting and receiving communication messages regarding the search, via the wireless communication unit 311, with another communication terminal existing around the own communication terminal (step S301). The search for a nearby communication terminal is performed in conformity with Device Discovery Procedure of the Wi-Fi Direct specification, for example. When the control unit 312 finds a communication terminal through the search (YES at step S302), the control unit 312 proceeds to the processing of step S303. Meanwhile, if the control unit 312 fails to find any communication terminal, the control unit 312 continues processing to search for a nearby communication terminal.

Next, at step S303, the control unit 312 of the communication terminal 310 stores information (for example, Prove Response) received from the communication terminal found, in the storage unit 314. Then, the control unit 312 activates the timer 316 (step S304). Then, the control unit 312 searches for a nearby communication terminal by the same method as that of step S301 (step S305). Then, the control unit 312 determines whether a new communication terminal is found or time-out occurs (steps S306, S308). If a new communication terminal is found, the control unit 312 stores the information (for example, Probe Response) received from the found communication terminal in the storage unit 314 (step S307). Then, it proceeds to the processing of step S308. On the other hand, if time-out is detected at step S308, the control unit 312 proceeds to the processing of step S309, while if time-out has not occur, it returns to the processing of step S305.

At step S309, the control unit 312 of the communication terminal 310 determines a connection counterpart from one or more communication terminals found through the search up to this point. Specifically, if there is a connected master terminal in the one or more communication terminals found, the control unit 312 determines a communication terminal, which is a connected master terminal, to be a connection counterpart. At this time, if there are a plurality of connected master terminals, the control unit 312 determines a connected master terminal having a larger number of clients to be a connection counterpart. Then, the control unit 312 proceeds to the processing of step S310. In another case, that is, if there is no connected master terminal in the one or more communication terminals found, the control unit 312 determines a communication terminal, of the one or more communication terminals which are not connected master terminals, to be a connection counterpart. Then, the control unit 312 proceeds to the processing of step S310.

Next, at step S310, the control unit 312 transmits and receives communication messages, via the wireless communication unit 311, with the other communication terminal determined to be a connection counterpart, and configures a communication network. Then, the communication terminal 310 begins transmission and reception of application data with the other communication terminal connected with the communication network, by the application unit 313.

Next, operation of the present embodiment will be described more specifically.

Figure 11:
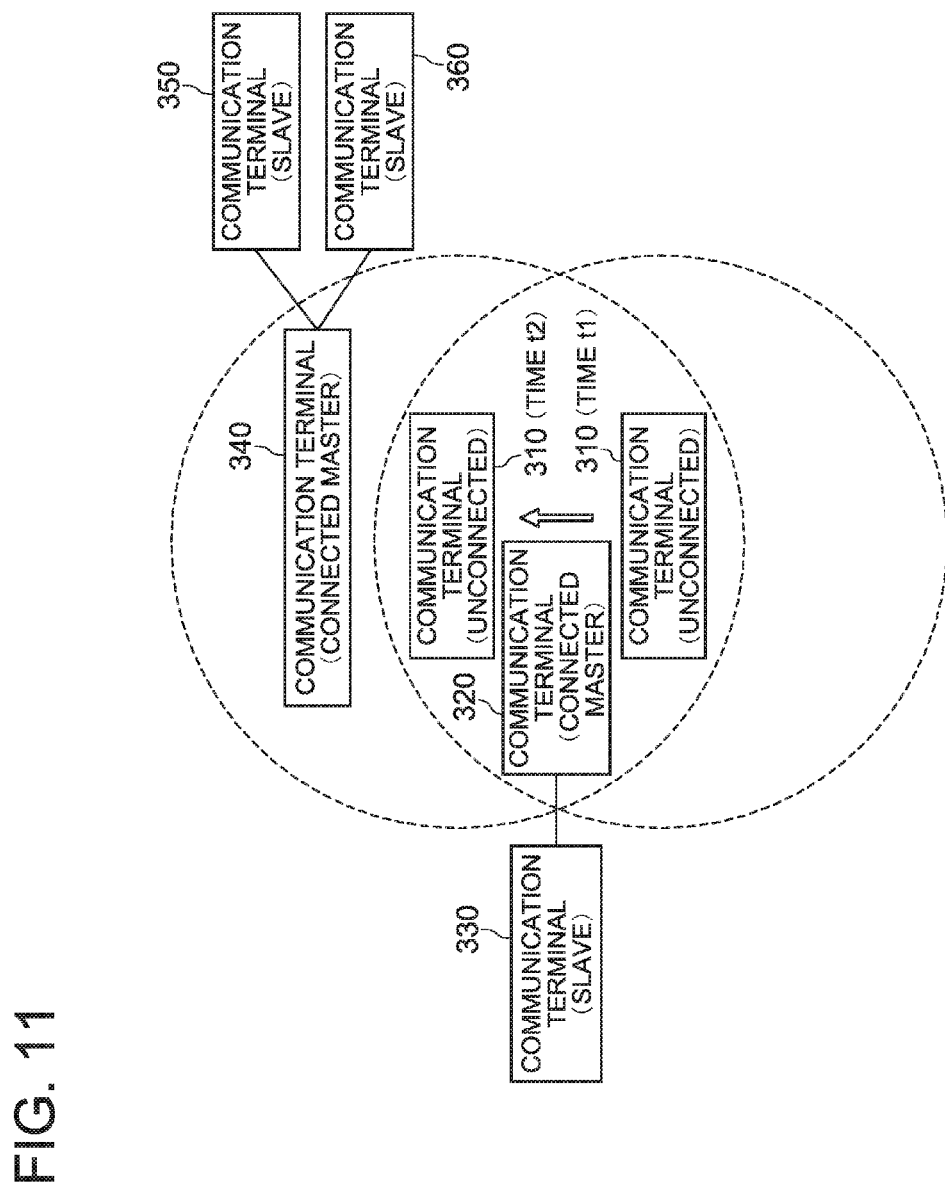
FIG. 11 is an explanatory diagram of a state where an unconnected communication terminal configures a network with another communication terminal in the third exemplary embodiment of the present invention.

As shown in FIG. 11, it is assumed that there are communication terminals 320 and 340 existing around the communication terminal 310 unconnected with any communication network. Here, the communication terminal 320 configures a network with another communication terminal 330 and functions as a master. Further, the communication terminal 340 configures a network with other communication terminals 350 and 360 and functions as a master. However, at a point of time t1, the communication terminal 320 is included in the communicable area of the communication terminal 310 but the communication terminal 340 is not included therein. Further, the communication terminal 310 moves in an arrow direction, and at a point of time t2, it is assumed that both the communication terminal 320 and the communication terminal 340 are included in the communicable area of the communication terminal 310.

Figure 12:
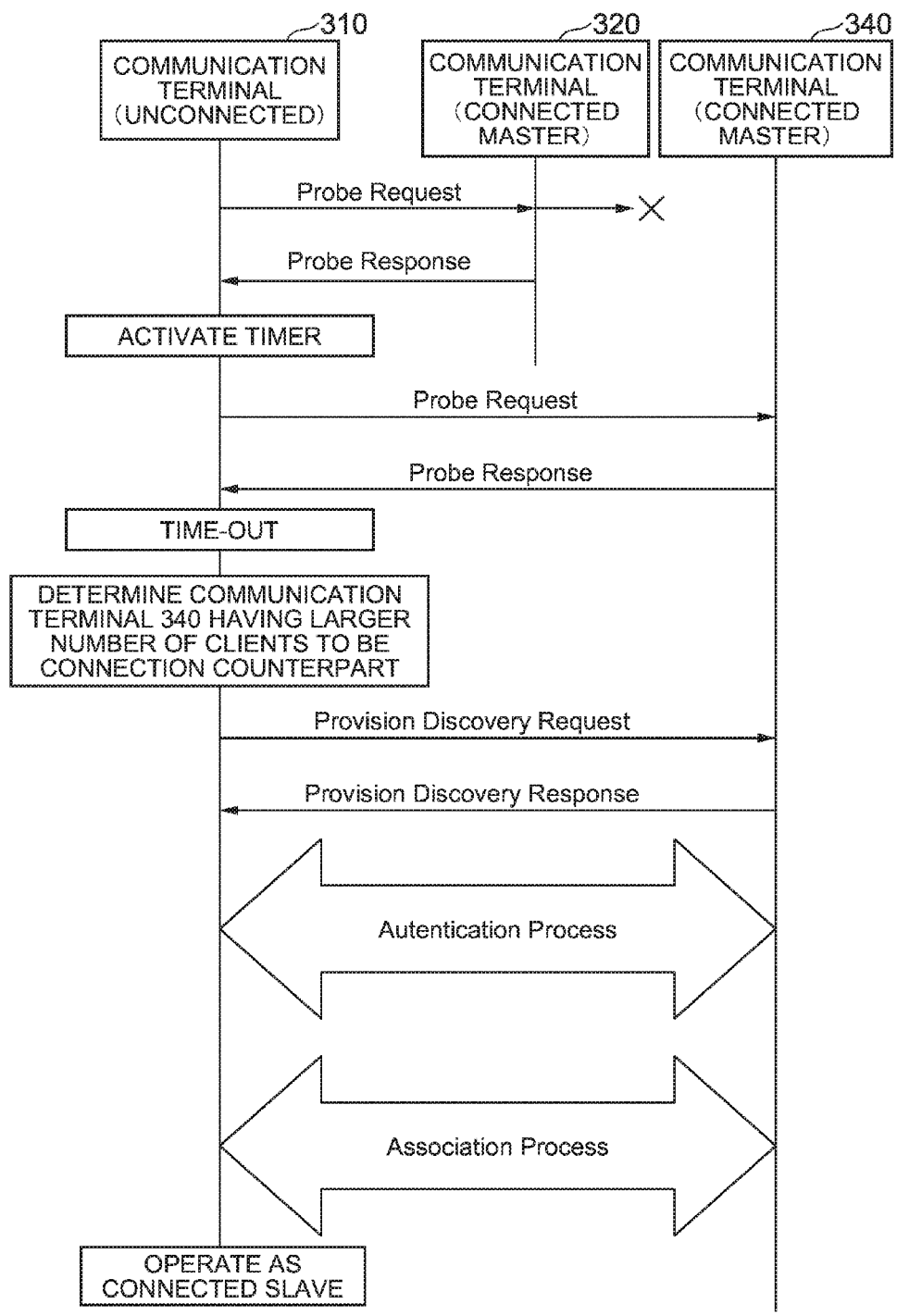
FIG. 12 is a sequence chart showing operation of constituting a network by an unconnected communication terminal with another communication terminal in the third exemplary embodiment of the present invention.

FIG. 12 is a sequence chart showing operation of the present embodiment. When the communication terminal 310 begins a searching operation from the time t1, it transmits Probe Request to the surroundings as shown in FIG. 12. The Probe Request is received by the communication terminal 320 existing in the communicable area of the communication terminal 310, and is not received by the communication terminal 340 in the outside of the communicable area of the communication terminal 310. When the communication terminal 320 receives the Probe Request and detects it, it returns Probe Response.

By receiving the Probe Response, the communication terminal 310 recognizes that the communication terminal 320 exists around the own communication terminal. Further, as the first communication terminal is found, the communication terminal 310 activates the timer 316, and continues the searching operation until time-out occurs in the timer 316. In the example shown in FIG. 12, Probe Request transmitted from the communication terminal 310 is received by the communication terminal 340 at a subsequent point of time, and Probe Response is transmitted from the communication terminal 340 to the communication terminal 310. By receiving the Probe Response, the communication terminal 310 recognizes that the communication terminal 340 exists around the own communication terminal.

In the example shown in FIG. 12, time-out occurs in the timer 316 subsequently. The communication terminal 310 terminates the search for another communication terminal with the time-out as a trigger, and determines a connection counterpart. In the example shown in FIG. 12, the communication terminal 310 found the connected master terminal 320 having one client and the connected master terminal 340 having two clients. Accordingly, the communication terminal 310 determines the communication terminal 340, having a larger number of clients, to be a connection counterpart. Then, as the communication terminal 340 determined to be a connection counterpart is a connected master terminal, the communication terminal 310 connects to the communication terminal 340 according to the procedure conforming to the Wi-Fi Direct specification.

In this way, according to the present embodiment, it is possible to prevent the communication terminal 310 intending to form a network having a larger number of communication terminals from failing to form such a network. This is because when the communication terminal 310 finds the first communication terminal, the communication terminal 310 continues processing of searching for other communication terminals, and after a certain period of time passed, if there is a connected master terminal in the one or more communication terminals found, the communication terminal 310 determines a communication terminal which is a connected master terminal to be a connection counterpart.

Further, according to the present embodiment, when a plurality of connected master terminals are found, as a connected master terminal having a larger number of clients is determined to be a connection counterpart, it is possible to form a communication network having a larger number of communication terminals.

[Fourth Exemplary Embodiment]

Figure 13:
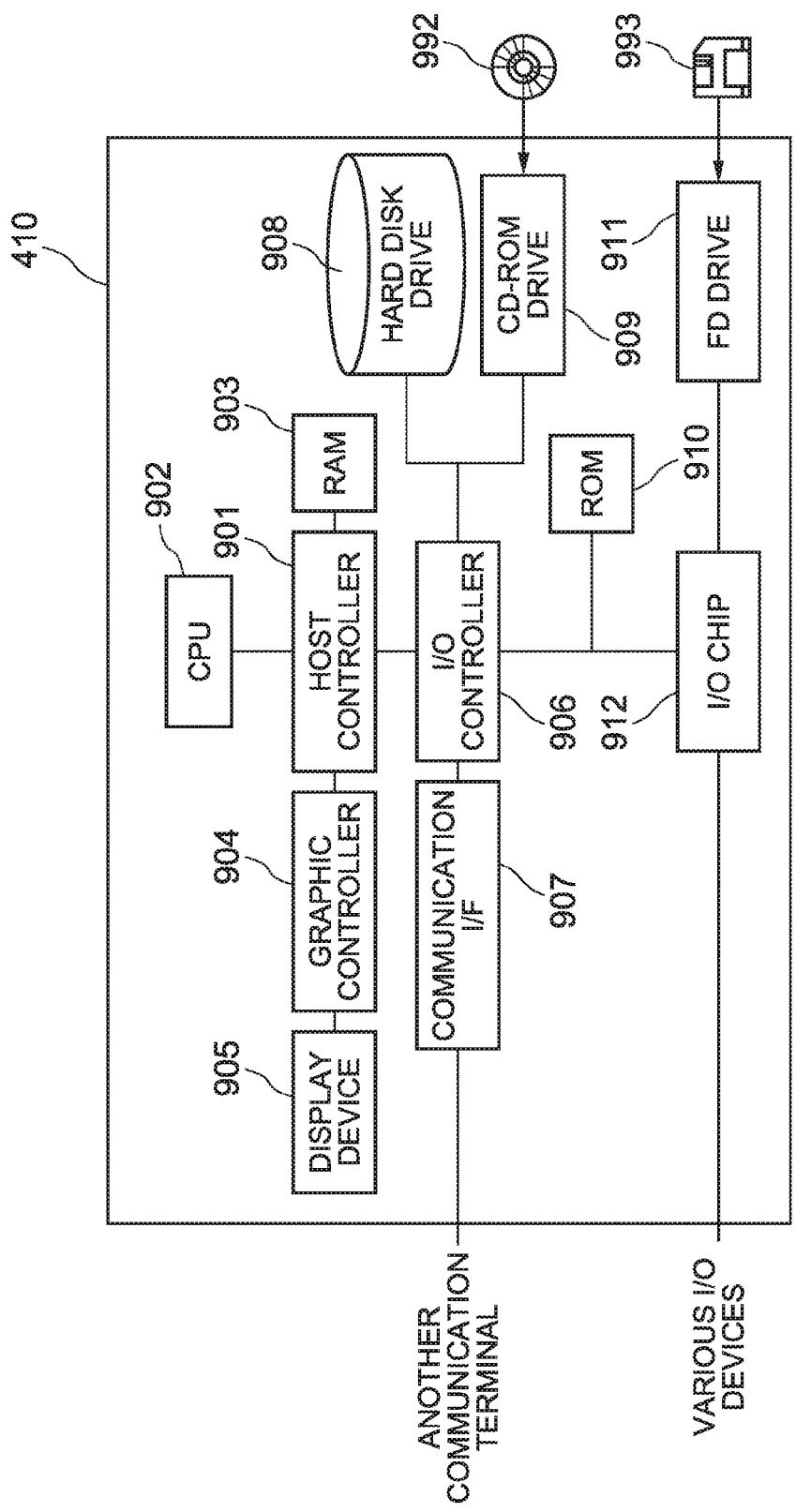
FIG. 13 is a block diagram of a communication terminal according to a fourth exemplary embodiment of the present invention.

FIG. 13 shows an example of a hardware configuration in which a communication terminal in each of the exemplary embodiments is configured of an electronic information processing device such as a computer. A communication terminal 410 of this example includes a CPU (Central Processing Unit) peripheral unit, an input/output unit, and a legacy input/output unit. The CPU peripheral unit includes a CPU 902, a RAM 903, a graphic controller 904, and a display device 905, which are interconnected by a host controller 901. The input/output unit includes a communication interface (I/F) 907, a hard disk drive 908, and a CD-ROM (Compact Disk Read Only Memory) drive 909, which are connected to the host controller 901 by an input/output (I/O) controller 906. The legacy input/output unit includes a ROM (Read Only Memory) 910, a flexible disk (FD) drive 911, and an input/output (I/O) chip 912, which are connected to the input/output controller 906.

The host controller 901 connects the RAM 903, and the CPU 902 accessing the RAM 903 at a high transfer rate and the graphic controller 904. The CPU 902 operates based on a program stored in the ROM 910 and the RAM 903 to control the respective units. The graphic controller 904 acquires image data generated on a frame buffer provided in the RAM 903 by the CPU 902 or the like, and displays it on the display device 905. Instead, the graphic controller 904 may have a frame buffer therein for storing image data generated by the CPU 902 or the like.

The input/output controller 906 connects the host controller 901, and the hard disk drive 908 which is a relatively high-speed input/output device, the communication interface 907, and the CD-ROM drive 909. The hard disk drive 908 stores a program used by the CPU 902 and data. The communication interface 907 connects to another communication terminal, and transmits and receives a program or data. The CD-ROM drive 909 reads a program or data from the CD-ROM 992, and supplies it to the hard disk drive 908 via the RAM 903 and to the communication interface 907.

The input/output controller 906 is connected with the ROM 910, the flexible disk drive 911, and relatively low-speed input/output devices of the input/output chip 912. The ROM 910 stores a boot program executed at the time of booting by the communication terminal 410, a program depending on hardware of the communication terminal 410, or the like. The flexible disk drive 911 reads a program or data from the flexible disk 993, and supplies it to the hard disk drive 908 and the communication interface 907 via the RAM 903. The input/output chip 912 connects respective types of input/output devices via the flexible disk drive 911, or a parallel port, a serial port, a keyboard port, a mouse port, or the like.

A program executed by the CPU 902 is stored on a recording medium such as the flexible disk 993, the CD-ROM 992, an IC (Integrated Circuit) card, or the like, and is supplied by a user. A program stored on the recording medium may be compressed or uncompressed. A program is installed from the recording medium to the hard disk drive 908, is read by the RAM 903, and is executed by the CPU 902. The program executed by the CPU 902 allows the communication terminal 410 to function as the wireless communication unit, the control unit, the storage unit, the application unit, and the like in each of the exemplary embodiments described above.

The program described above may be stored on an external storage medium. As a storage medium, an optical recording medium such as a DVD (Digital Versatile Disk) or a PD (Phase Disk), a magneto-optical recording medium such as a MD (Minidisk), a tape medium, a semiconductor memory such as an IC card, or the like may be used, besides the flexible disk 993 or the CD-ROM 992. Further, as a recording medium, it is also possible to use a storage medium such as a hard disk or a RAM provided in a server system connected with a dedicated communication network or the Internet, to thereby provide an information sharing system as a program via a network.

[Other Exemplary Embodiments]

While the present invention has been described using some exemplary embodiments, the present invention is not limited to the exemplary embodiments described above, and various additions and changes can be made therein. For example, an exemplary embodiment described below is also included in the present invention.

A communication terminal searched by a communication terminal, unconnected with a communication network, to configure a network, may be limited to a communication terminal having a particular communication address (MAC address) or a communication device name (node name). This means that a communication terminal previously stores a list of particular communication addresses and communication device names, and if a communication terminal found through the search does not satisfy the communication address or the communication terminal name of the found communication terminal described in the list, the found communication terminal may be handled as if it was not found.

The present invention is based upon and claims the benefit of priority from Japanese patent application No. 2013-143766, filed on Jul. 9, 2013, the disclosure of which is incorporated herein in its entirety by reference.

INDUSTRIAL APPLICABILITY

The present invention is applicable to a method of configuring a communication network, in particular, a communication network in which one communication terminal of a plurality of communication terminals functions as a master having a function of an access point, and the rest of the communication terminals function as slaves of the master.

REFERENCE NUMERALS 110 communication terminal
111 wireless communication unit
112 control unit
113 application unit
114 storage unit
115 antenna

The invention claimed is:

1. A network configuration method to be executed by a first communication terminal, the network configuration method comprising:
searching for a second communication terminal;
when the second communication terminal is found, storing information included in a communication message received from the second communication terminal;
changing a position of the first communication terminal, and searching for a third communication terminal;
when the third communication terminal is found, storing information included in a communication message received from the third communication terminal;
selecting a fourth communication terminal that functions as an access point for the second communication terminal and for the third communication terminal based on the information received therefrom, and determining the fourth communication terminal as a connection counterpart; and
configuring a communication network with the determined connection counterpart.

2. The network configuration method according to claim 1, further comprising:
after the second communication terminal is found for a certain period of time, terminating the searching for the third communication terminal.

3. The network configuration method according to claim 1, wherein
if the second communication terminal and the third communication terminal function as access points, selecting the fourth communication terminal in accordance with a number of slaves of the second and third communication terminals.

4. The network configuration method according to claim 1, wherein
the communication network conforms to a Wi-Fi Direct specification.

* * * * *